United States Patent
Quennehen et al.

(10) Patent No.: US 12,385,404 B2
(45) Date of Patent: Aug. 12, 2025

(54) BLADE MADE OF COMPOSITE MATERIAL WITH AT LEAST PARTIALLY CERAMIC MATRIX

(71) Applicant: SAFRAN AIRCRAFT ENGINES, Paris (FR)

(72) Inventors: Lucien Henri Jacques Quennehen, Moissy-Cramayel (FR); Christophe Touchon, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/252,957

(22) PCT Filed: Dec. 8, 2021

(86) PCT No.: PCT/FR2021/052237
§ 371 (c)(1),
(2) Date: May 15, 2023

(87) PCT Pub. No.: WO2022/129734
PCT Pub. Date: Jun. 23, 2022

(65) Prior Publication Data
US 2023/0366319 A1   Nov. 16, 2023

(30) Foreign Application Priority Data
Dec. 18, 2020 (FR) ...................... 2013604

(51) Int. Cl.
*F01D 5/28* (2006.01)
*B33Y 10/00* (2015.01)
*C04B 35/71* (2006.01)

(52) U.S. Cl.
CPC ............. *F01D 5/282* (2013.01); *F01D 5/284* (2013.01); *B33Y 10/00* (2014.12); *C04B 35/71* (2013.01);
(Continued)

(58) Field of Classification Search
CPC .............................. F01D 5/282; F01D 5/284
See application file for complete search history.

(56) References Cited

U.S. PATENT DOCUMENTS 8,607,454 B2 * 12/2013 Blanchard ......... C04B 35/62868
29/889.23
9,045,992 B2 * 6/2015 Roussille ................ F01D 5/225
(Continued)

FOREIGN PATENT DOCUMENTS

EP   2 349 688 B1   9/2014
EP   2 585 281 B1   5/2019
(Continued)

OTHER PUBLICATIONS

Machine translation of WO 2019122760 A1 (Year: 2019).*
(Continued)

*Primary Examiner* — Christopher R Legendre
(74) *Attorney, Agent, or Firm* — Pillsbury Winthrop Shaw Pittman LLP

(57) ABSTRACT

A blade made of composite material includes a fibrous reinforcement and an at least partially ceramic matrix, wherein the fibrous reinforcement includes a first structural portion formed by three-dimensional or multilayer weaving, and a second functional portion, distinct from the first portion, including short fibers.

7 Claims, 2 Drawing Sheets

(52) U.S. Cl.
CPC ............... *C04B 2235/526* (2013.01); *C04B 2235/6026* (2013.01); *C04B 2235/616* (2013.01); *F05D 2300/6033* (2013.01)

(56) References Cited

U.S. PATENT DOCUMENTS

| | | | |
|---|---|---|---|
| 9,062,562 B2* | 6/2015 | Coupe | .................. F01D 5/282 |
| 9,080,454 B2* | 7/2015 | Coupe | .............. C04B 35/62873 |
| 9,598,967 B2* | 3/2017 | Xu | ...................... F01D 5/3092 |
| 10,046,482 B2* | 8/2018 | Marsal | .................. F01D 5/282 |
| 11,014,856 B2* | 5/2021 | Delehouze | .......... C04B 35/6455 |
| 11,333,037 B2* | 5/2022 | Sobanski | .................. F01D 9/04 |
| 11,578,003 B2* | 2/2023 | Delehouze | ........ C04B 35/62884 |
| 2016/0177745 A1 | 6/2016 | Uskert et al. | |
| 2016/0243777 A1 | 8/2016 | Marchal et al. | |
| 2017/0129207 A1 | 5/2017 | Hallander et al. | |
| 2017/0369382 A1 | 12/2017 | Billotte Cabre et al. | |
| 2018/0036914 A1 | 2/2018 | Marsal et al. | |
| 2018/0119549 A1* | 5/2018 | Vetters | .................. F01D 5/147 |
| 2019/0224938 A1 | 7/2019 | Feie et al. | |
| 2019/0323363 A1 | 10/2019 | Sippel et al. | |
| 2019/0360345 A1 | 11/2019 | De Gaillard et al. | |
| 2019/0376389 A1 | 12/2019 | Roberts et al. | |
| 2021/0292245 A1* | 9/2021 | Bouillon | ............... C04B 35/584 |
| 2023/0366319 A1* | 11/2023 | Quennehen | ............ F01D 5/282 |

FOREIGN PATENT DOCUMENTS

| | | |
|---|---|---|
| FR | 2 961 845 A1 | 12/2011 |
| JP | 2020-509957 A | 4/2020 |
| WO | WO 2019/122760 A1 | 6/2019 |
| WO | WO 2019/129950 A1 | 7/2019 |
| WO | WO 2020/025878 A1 | 2/2020 |

OTHER PUBLICATIONS

Non-Final Office Action as issued in U.S. Appl. No. 18/257,029, dated Oct. 23, 2023.

Notice of Allowance as issued in U.S. Appl. No. 18/257,029, dated Feb. 5, 2024.

International Search Report as issued in International Patent Application No. PCT/FR2021/052237, dated Apr. 14, 2022.

* cited by examiner

[Fig. 1]
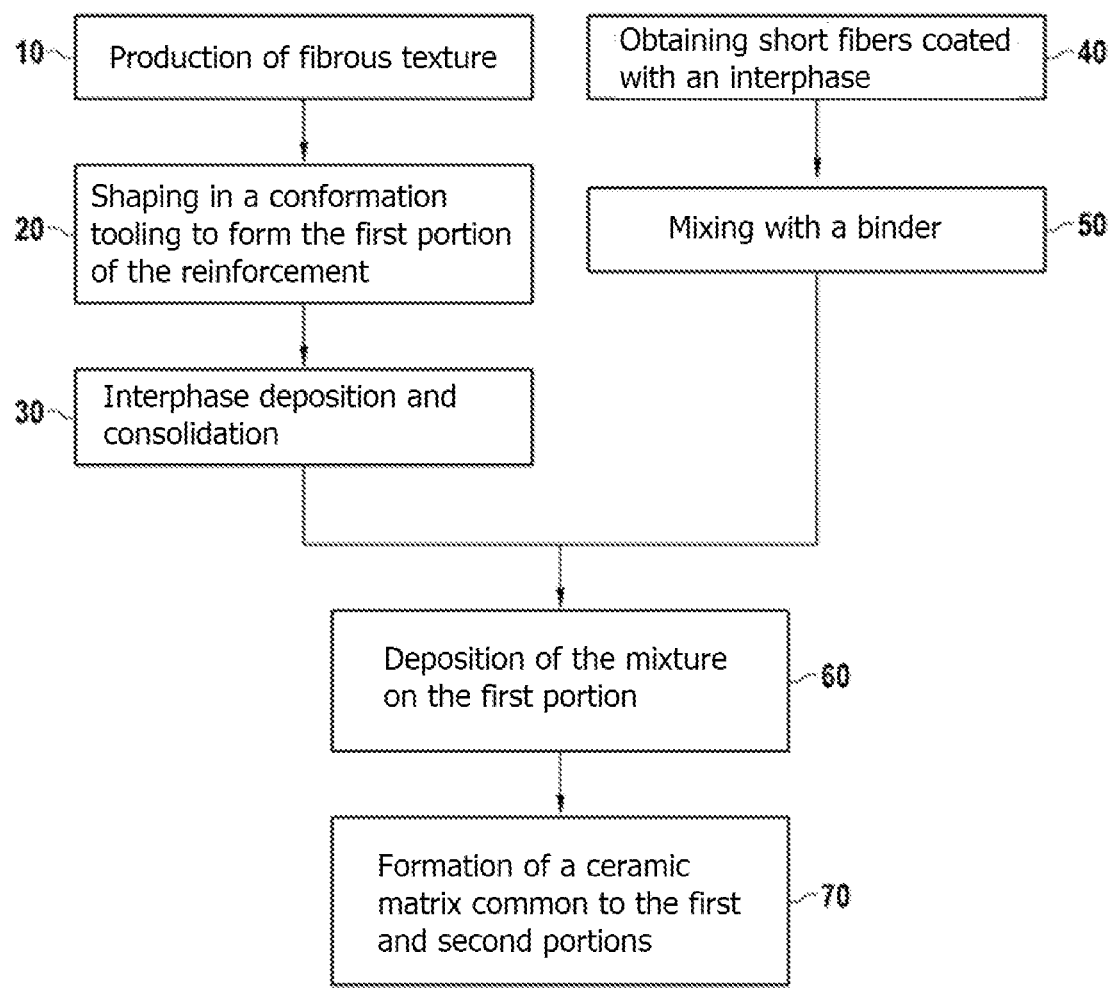

[Fig. 2]
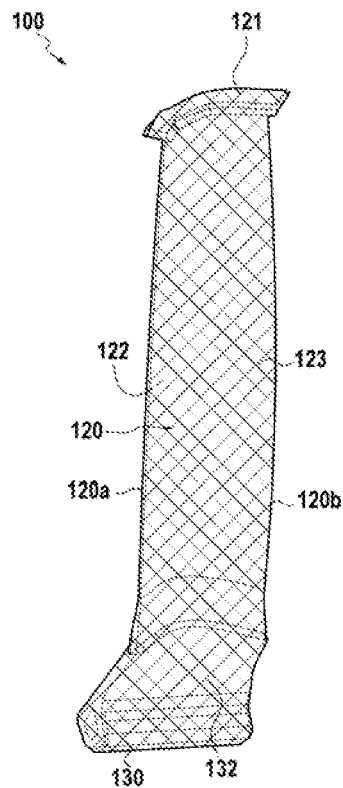
[Fig. 3]
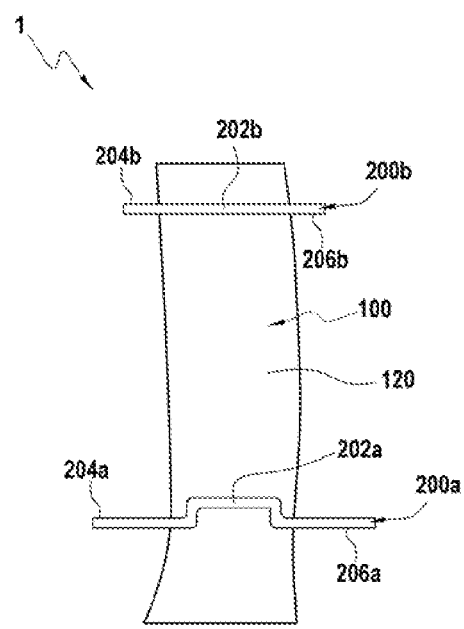

BLADE MADE OF COMPOSITE MATERIAL WITH AT LEAST PARTIALLY CERAMIC MATRIX

CROSS-REFERENCE TO RELATED APPLICATIONS

This application is the U.S. National Stage of PCT/FR2021/052237, filed Dec. 8, 2021, which in turn claims priority to French patent application number 20 13604 filed Dec. 18, 2020. The content of these applications are incorporated herein by reference in their entireties.

TECHNICAL FIELD

The invention relates to a blade made of a composite material with at least partially ceramic matrix, a material hereinafter designated by CMC.

PRIOR ART

In aeronautical engines and in particular in gas turbines or turbomachines of such engines, the parts subjected to high temperatures have long been made of metal alloys. In order to significantly reduce the mass and allow higher operating temperatures than those allowed with current metal alloys, composite materials with a ceramic matrix are increasingly used.

Indeed, composite materials with a ceramic matrix are part of composite materials called thermostructural composite materials, that is to say composite materials having good mechanical properties and an ability to retain these properties at high temperature. Furthermore, parts, such as blades, made of CMC have a significant weight saving compared to the same parts made with the usual metal alloys. CMC parts can be formed by a fibrous reinforcement made of refractory fibers (carbon or ceramic) obtained by three-dimensional or multilayer weaving which is densified by a ceramic matrix. Nevertheless, weaving can have limitations if it is desired to obtain relatively complex shapes.

DISCLOSURE OF THE INVENTION

The present invention relates to a blade made of composite material comprising a fibrous reinforcement and an at least partially ceramic matrix,
the blade being characterized in that the fibrous reinforcement comprises a first structural portion formed by three-dimensional or multilayer weaving, and a second functional portion, distinct from the first portion, comprising short fibers.

The blade according to the invention has a hybrid fibrous reinforcement formed by three-dimensional or multilayer weaving in a structural portion and by short fibers in one or more distinct functional areas of the structural portion. The use of three-dimensional or multi-layer fabric confers excellent mechanical resistance in the portion which supports the forces in operation, for example the centrifugal forces in the case of a rotating blade. The implementation of short fibers in the functional portion allows, in turn, access in this last portion to more complex shapes than those that can be obtained by weaving while maintaining a reduced manufacturing cost and good mechanical properties.

In an exemplary embodiment, the first portion forms the fibrous reinforcement of the root, of the stilt and of the airfoil of the blade.

It is particularly advantageous to use a three-dimensional or multi-layer fabric in those areas which are subjected to the highest stresses in operation.

In an exemplary embodiment, the second portion forms the fibrous reinforcement of a platform of the blade and of platform spoilers and/or of the root of the blade and of root spoilers.

It is particularly advantageous to use short fibers in these areas in order to be able to give them a complex shape.

In an exemplary embodiment, the short fibers have an average length less than or equal to 5000 μm.

Unless otherwise stated, an average dimension designates the dimension given by the statistical particle size distribution to half the population, called D50.

In an exemplary embodiment, the blade is a turbine blade or a compressor blade. The invention also relates to a turbomachine comprising a blade as described above. The invention also relates to a method for manufacturing a blade as described above, in which the method comprises:
depositing a mixture of short fibers and a binder on the first portion of the fibrous reinforcement,
removing the binder, and
forming a ceramic matrix phase common to the short fibers and to the first portion of the fibrous reinforcement.

In an exemplary embodiment, the first portion is consolidated before depositing the mixture. In this case, the first portion is densified by a consolidation phase which allows it to retain its shape without the assistance of a holding tool.

In an exemplary embodiment, the mixture of the short fibers and the binder is deposited by additive manufacturing.

The use of additive manufacturing to deposit the mixture allows to access complex shapes and therefore to further expand the geometries that can be obtained compared to weaving.

In an exemplary embodiment, the common ceramic matrix is formed by melt infiltration.

BRIEF DESCRIPTION OF THE DRAWINGS

FIG. 1 shows a flowchart of a succession of steps of a method for manufacturing an example of a blade according to the invention.

FIG. 2 shows the first portion of the fibrous reinforcement of an example of a blade according to the invention.

FIG. 3 schematically and partially shows the second portion of the fibrous is reinforcement on the first portion.

DESCRIPTION OF EMBODIMENTS

FIG. 1 shows successive steps of an example of a method for manufacturing a CMC blade according to the invention.

In step 10, a fibrous texture intended to form the first portion of the fibrous reinforcement of the blade to be obtained is produced by three-dimensional weaving or by multi-layer weaving. Here "three-dimensional weaving" or "3D weaving" means a mode of weaving by which at least some of the warp yarns bind weft yarns over several weft layers, such as for example "interlock weaving". Here "interlock weave" means a 3D weaving pattern in which each warp layer binds several weft layers with all the yarns of the same warp column having the same movement in the plane of the weave. It will be noted that an inversion of the roles between warp and weft is possible, and must be considered as also covered by the claims. "Multi-layer weave", here means a 3D weave with several weft layers whose basic weave of each layer is equivalent to a conventional 2D fabric weave, such as a weave of the plain, satin or twill type, but with certain points of the weave that bind the weft layers together.

The production of the fibrous texture by 3D or multi-layer weaving allows to obtain a bond between the layers and therefore to have good mechanical strength of the fibrous texture and of the blade made of composite material obtained in the structural portion of the blade.

The fibrous texture can be produced in known manner by means of a Jacquard-type weaving loom on which a bundle of warp or strand yarns has been placed in a plurality of layers, the warp yarns being bound by layers of weft or strand yarns also disposed in a plurality of layers.

The yarns or strands used for the texture may consist of ceramic fibers, for example fibers formed essentially of silicon carbide SiC (hereinafter referred to as SiC fibers) or of silicon nitride $Si_3N_4$. In particular, it is possible to use yarns supplied by the Japanese company Nippon Carbon under the reference "Hi-Nicalon" or under the reference "Hi-Nicalon Type-S". The yarns or strands used can also consist of carbon fibers.

In step 20, the fibrous texture is shaped and maintained in its shape by means of a conformation tooling, to obtain, after shaping, the first portion of the fibrous reinforcement.

FIG. 2 shows an example of the first portion 100 of the fibrous reinforcement defining in a single piece of fabric the fibrous reinforcement of the root 130, of the stilt 132 and the airfoil 120 of the blade to be obtained. There may be textile continuity in the first portion 100. The fabric forming the first portion 100 may be devoid of a debonding area. In the blade reinforcement, the three-dimensional or multilayer weaving is advantageously present only in the structural area of the blade so as to simplify as much as possible the production of the fiber reinforcement. The airfoil 120 extends in the longitudinal direction between its root 130 and its top 121 and has in cross section a curved profile of variable thickness delimiting two faces 122 and 123, corresponding respectively to the upper surface wall and the lower surface wall of the blade and each connecting the leading edge 120a and the trailing edge 120b of the latter. The blade to be obtained in the example illustrated is a rotating blade which is intended to be mounted on a turbine rotor (not illustrated) by engagement of the root 130 in a housing of corresponding shape provided at the periphery of the rotor.

The first portion being maintained in its conformation tooling, for example made of graphite, an embrittlement-release interphase is formed in a known manner by chemical vapor infiltration ("CVI") on the fibers of the first portion 100 (step 30). The interphase can be monolayer or multi-layer. The interphase may comprise at least one layer of pyrolytic carbon (PyC), boron nitride (BN), silicon-doped boron nitride (BN(Si), with silicon in a mass proportion comprised between 5% and 40%, the balance being boron nitride) or boron-doped carbon (BC, with boron in an atomic proportion comprised between 5% and 20%, the balance being carbon). The thickness of the interphase can be comprised between 10 nm and 1000 nm, for example between 10 nm and 800 nm.

During step 30, the first portion 100 can also be consolidated by a matrix phase or layer deposited by chemical infiltration in the vapor phase or by liquid process. In the case of the gas process, the first portion 100 is maintained in the conformation tooling in an oven while a layer of ceramic matrix is formed by chemical vapor is infiltration on the interphase for consolidation of the first portion, that is to say to bind the fibers of the preform sufficiently together so that the first portion can retain its shape without the assistance of the conformation tooling. This matrix layer is for example SiC. The matrix layer can also be a layer of a self-healing material containing boron, for example a ternary system Si-B-C or boron carbide $B_4C$ capable of forming, in the presence of oxygen, a glass of the type borosilicate with self-healing properties.

Liquid consolidation consists of impregnating the first portion with a liquid ceramic precursor and performing a pyrolysis heat treatment to transform the precursor into ceramic. Liquid ceramic precursors, in particular of SiC, can be resins of the polycarbosilane (PCS) or polytitanocarbosilane (PTCS) or polysilazane (PSZ) type. The thickness of the first matrix phase is at least equal to 500 nm. As indicated above, the total thickness of the interphase and of the matrix layer is chosen to be sufficient to consolidate the first portion, that is to say to sufficiently bind together the fibers of the first portion so that the first portion can be handled while retaining its shape without the assistance of holding tools. This thickness may be at least equal to 500 nm. After consolidation, the first portion remains porous, the initial porosity being for example only filled for a minority portion by the interphase and the matrix layer.

Optionally, the first portion can be impregnated with a slurry-cast comprising a powder of ceramic particles, for example silicon carbide optionally with particles of carbon, silicon nitride $Si_3N_4$, boron carbide $B_4C$, titanium silicide $TiSi_2$. Still optionally, it is possible to carry out a rise of liquid silicon in the first portion in order to pre-densify it before forming the second portion.

In parallel, short fibers coated with an interphase are prepared (step 40). For this purpose, it is possible to deposit, in a manner known per se, on long fibers circulating in an enclosure an interphase by chemical vapor deposition ("CVD"). The interphase may be as described above. The long fibers coated with the interphase can then be cut in order to obtain the short fibers coated with the interphase. Alternatively, it is possible to deposit the interphase on a fibrous structure, for is example corresponding to a scrap from a previous textile operation, then obtain the short fibers coated with the interphase by grinding this fibrous structure. It is also possible to form the interphase directly on the short fibers by calefaction as described in document WO 2019/129950.

The short fibers can have an average length less than or equal to 1 mm, for example less than or equal to 500 μm. The average length of the short fibers can be comprised between 10 μm and 5 mm, for example between 10 μm and 1 mm, for example between 10 μm and 500 μm. The short fibers 11 can have an average diameter less than or equal to 20 μm, for example between 5 μm and 20 μm, or even between 8 μm and 14 μm. The short fibers can have a generally cylindrical shape.

The short fibers coated with the interphase are then mixed with a binder. The binder can comprise at least one polymer optionally with a plasticizer. In an exemplary embodiment, the binder can comprise at least one thermoplastic polymer. For example, the binder may comprise at least one compound selected from the following: polyvinyl alcohol (PVA), polyethylene glycol (PEG), polypropylene (PP), polyoxymethylene (POM), polyethylene terephthalate (PET). In an exemplary embodiment, the binder can comprise at least one thermosetting polymer. For example, the binder can comprise at least one compound selected from the following: epoxy resins, phenolic resins, pre-ceramic resins.

It may be advantageous to heat the binder to facilitate mixing and allow better homogenization. The mixing temperature then depends on the binders used in order, on the one hand, not to degrade them thermally and, on the other hand, not to polymerize them prematurely. The mixture can also be prepared under vacuum so as to reduce the presence of air bubbles in the mixture.

A mixture comprising the short fibers which are intended to form the second portion of the fibrous reinforcement is then obtained.

The method continues by forming the second portion of the fibrous reinforcement on the first portion (step 60). The mixture is first deposited on the first portion in the area(s) where it is desired to form the second portion. The mixture can be injected into a mold having at least one cavity in the shape of the second portion to be obtained. Alternatively, the mixture can be deposited by additive manufacturing on the first portion 100. As such, it is possible to use a fused filament deposition technique ("Fused Deposition Modeling"; "FDM") or binder-jetting.

The assembly formed from the mixture of binder and deposited short fibers and of the first portion 100 is then maintained in the desired shape. The binder can then be removed, for example by thermal pyrolysis treatment, in a manner known per se.

The short fibers and the first portion 100 are then co-densified by a common ceramic matrix phase. This common matrix phase densifies both the short fibers and the first portion 100 (step 70).

Co-densification can be carried out by infiltrating a molten composition into the pores of the first portion 100 and into the pores between the short fibers. In an exemplary embodiment, the molten composition can comprise an intermetallic compound. In an exemplary embodiment, the molten composition can comprise silicon. The molten composition may consist of pure molten silicon or alternatively be in the form of a molten alloy of silicon and one or more other constituents. The molten composition can mainly comprise silicon by mass, that is to say have a silicon content by mass greater than or equal to 50%. The molten composition may for example have a mass content of silicon greater than or equal to 75%. The constituent(s) present within the silicon alloy may be selected from B, Al, Mo, Ti, and mixtures thereof. A chemical reaction can occur between the molten composition and carbon present in the porosity (for example a pyrolysis residue) during infiltration, resulting in the formation of silicon carbide (method for reactive infiltration in the molten state or "Reactive Melt Infiltration").

A blade made of composite material with at least partially ceramic matrix is thus obtained. The blade matrix can be partially or entirely made of ceramic material. The case where the common matrix is formed by infiltration in the molten state has just been described, but it does not depart from the scope of the invention if another method is implemented, such as chemical vapor infiltration, for example. FIG. 3 schematically illustrates the blade 1 obtained comprising in particular the first portion 100 and the second portion of the reinforcement which comprises two distinct portions 200a and 200b. The two portions 200a and 200b comprise the short fibers. Regardless of the embodiment considered, the second portion 200a and 200b can be intended to provide a sealing function. Here, the portion 200a forms the fibrous reinforcement of a platform 202a and of the upstream 204a and downstream 206a platform spoilers. The inner radial end of the airfoil 120 is connected to the blade platform 202a whose outer (or upper) face 203a delimits, radially inside, the flow path of the gas stream. The portion 200b forms the fibrous reinforcement of a outer platform 202b and of the upstream 204b and downstream 206b spoilers of the outer platform. The short fibers are advantageously present only in non-structural areas of the blade and only in the second portion 200a and 200b. The short fibers are non-woven. The short fibers are dispersed in the common ceramic matrix. The distribution of the short fibers is macroscopically isotropic, which gives good mechanical properties to the part. The short fibers can be present throughout the volume of the second portion 200a and 200b. In particular, the short fibers can be present in the entire volume of the platform 202a and of the platform spoilers 204a and 206a and/or in the entire volume of the outer platform 202b and of the outer platform spoilers 204b and 206b. The short fibers can be present in a connection area of the second portion 200a and 200b with the airfoil 120 portion, in contact with the airfoil 120 portion. The short fibers can be present in the second portion 200a and 200b from the area connecting the second portion 200a and 200b with the airfoil portion 120 to the edges of the second portion 200a and 200b. The second portion 200a and 200b can be devoid of three-dimensional or multilayer fabric.

The blade formed may be a rotating blade, intended to be fixed to a rotor. The blade formed may be a turbine blade, for example a high pressure or low pressure turbine blade. The blade may be a blade for an aircraft engine gas turbine. The blade may alternatively be a compressor blade.

The outer surface of the blade or a portion of this surface can be coated with a layer of ceramic paint or an environmental barrier, or EBC ("Environmental barrier Coating").

The expression "comprised between . . . and . . . " must be understood as including the limits.

The invention claimed is:

1. A method for manufacturing a blade made of composite material, the blade comprising a fibrous reinforcement that is densified by a matrix that is at least partially ceramic, wherein the fibrous reinforcement comprises a first structural portion formed by three-dimensional weaving densified by said matrix, and a second functional portion consisting essentially of short fibers densified by said matrix and wherein the second functional portion forms a platform of the blade and spoilers of the platform and/or spoilers of a root of the blade, wherein the short fibers have an average length less than or equal to 5000 µm, and wherein the first structural portion and the second functional portion are co-densified with said matrix, wherein the method comprises:
   depositing a mixture of the short fibers and a binder on the first structural portion of the fibrous reinforcement,
   removing the binder, and
   forming the matrix, which includes a ceramic matrix phase common to the short fibers and to the first structural portion of the fibrous reinforcement.

2. The method according to claim 1, wherein the first structural portion is consolidated before depositing the mixture.

3. The method according to claim 1, wherein the mixture of the short fibers and the binder is deposited by additive manufacturing.

4. The method according to claim 1, wherein the common ceramic matrix phase is formed by melt infiltration.

5. The method according to claim 1, wherein the first structural portion forms the fibrous reinforcement of the root, of a stilt and of an airfoil of the blade.

6. The method according to claim 1, wherein the short fibers have an average length less than or equal to 1000 µm.

7. The method according to claim 1, wherein the blade is a turbine blade or a compressor blade.

\* \* \* \* \*